Nov. 3 1925.　　　　　　　　　　　　　　　　　　1,559,741
R. L. CROSS
PRESSURE SYSTEM
Filed Dec. 13, 1924　　　2 Sheets-Sheet 1

R. L. Cross
INVENTOR
BY Victor J. Evans
ATTORNEY

Nov. 3, 1925.

R. L. CROSS

PRESSURE SYSTEM

Filed Dec. 13, 1924

R. L. Cross
INVENTOR

BY Victor J. Evans
ATTORNEY

WITNESS:

Patented Nov. 3, 1925.

1,559,741

UNITED STATES PATENT OFFICE.

RAY L. CROSS, OF LONG ISLAND, VIRGINIA.

PRESSURE SYSTEM.

Application filed December 13, 1924. Serial No. 755,782.

*To all whom it may concern:*

Be it known that I, RAY L. CROSS, a citizen of the United States, residing at Long Island, in the county of Campbell and State of Virginia, have invented new and useful Improvements in Pressure Systems, of which the following is a specification.

This invention relates to improvements in pressure systems.

The primary object of the invention is to provide an air pressure system for the fuel tank of a motor vehicle to force the fuel from the tank to the carburetor of the motor vehicle when going up long steep grades and when the fuel will not flow through the medium of gravity or the like.

A further object is to provide an air pressure system for fuel tanks that can be easily and expeditiously installed to a motor vehicle without the aid of an experienced mechanic or the like.

This invention also consists in certain other features of construction and in the combination and arrangement of the several parts, to be hereinafter fully described illustrated in the accompanying drawings and specifically pointed out in the appended claims.

In describing my invention in detail, reference will be had to the accompanying drawings wherein like characters denote like or corresponding parts throughout the several views, and in which.

Figure 1:
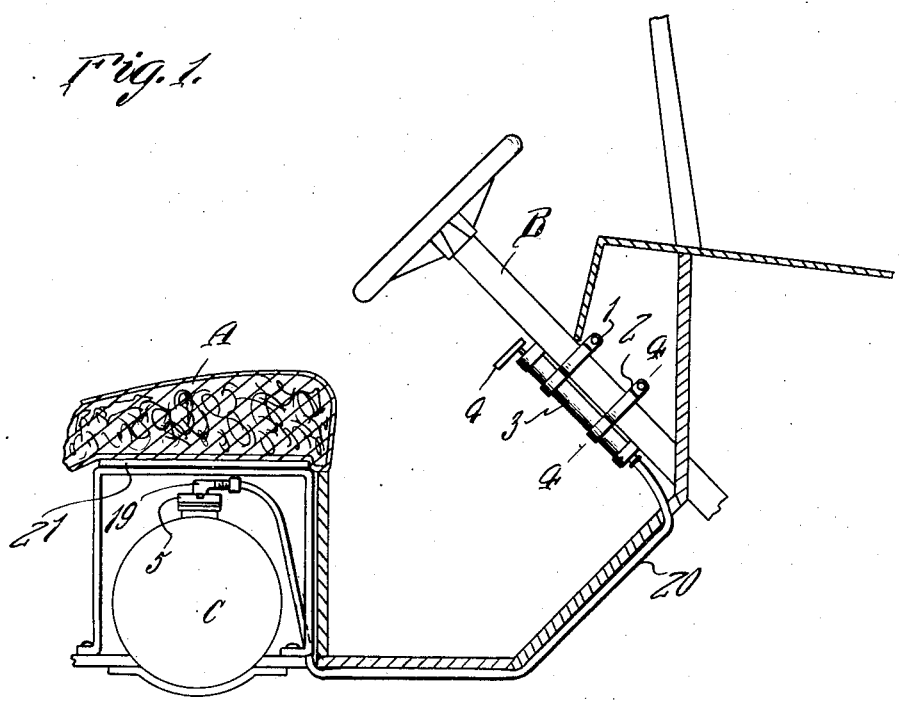
Figure 1 is a longitudinal sectional view taken through a fragmentary portion of a motor vehicle to illustrate the application of the device forming the subject matter of the present invention.
Figure 4:
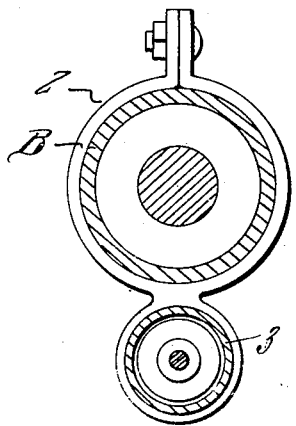
Figure 4 is a sectional view taken on line 4—4 of Figure 1.
Figure 6:
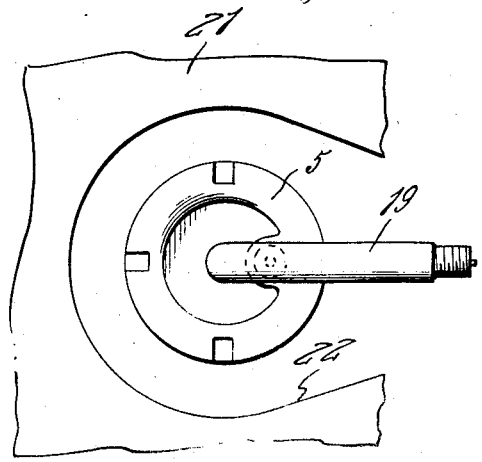
Figure 6 is a top plan view of the fuel tank cap employed showing a fragmentary portion of the cap guard.

Referring to the drawings in detail the letter A broadly indicates a fragmentary portion of a motor vehicle, B the steering column thereof and C the fuel tank.

Secured to the steering column through the medium of a pair of spaced clamps 1 and 2 is a force pump 3 having its handle 4 arranged in close association with the driver's seat of the vehicle whereby the driver thereof may conveniently operate the device.

The gasoline tank C is of the customary construction and is provided with the usual threaded inlet opening which receives the threaded cap 5 which is provided with a centrally disposed opening 6. An air inlet pipe 7 passes through the centrally disposed opening 6 and terminates adjacent the bottom of the tank. The cap is mounted upon the air inlet pipe 7 for rotary movement and with a view of forming an air tight connection between the pipe and tank, a shoulder 8 is formed on the pipe and a gasket 9 is disposed between the shoulder and cap as shown. A coil spring 10 surrounds the pipe and has its lower convolution received in a cup shape element 11 which is prevented from downward movement on the pipe by a pin 12. The upper convolution of the coil spring 10 engages a washer 12 having a circumferentially downwardly extending washer formed thereon and between the flanged washer and the cap there is disposed a gasket 13. From this structure it will be obvious that even though the cap is mounted for rotary movement on the air inlet pipe 7, an air tight connection is provided as above set forth, as the pressure of the spring against the flanged washer 12 and cup shape element 11 will cause the respective washers 9 and 12 to impress the cap for that purpose.

Figure 2:
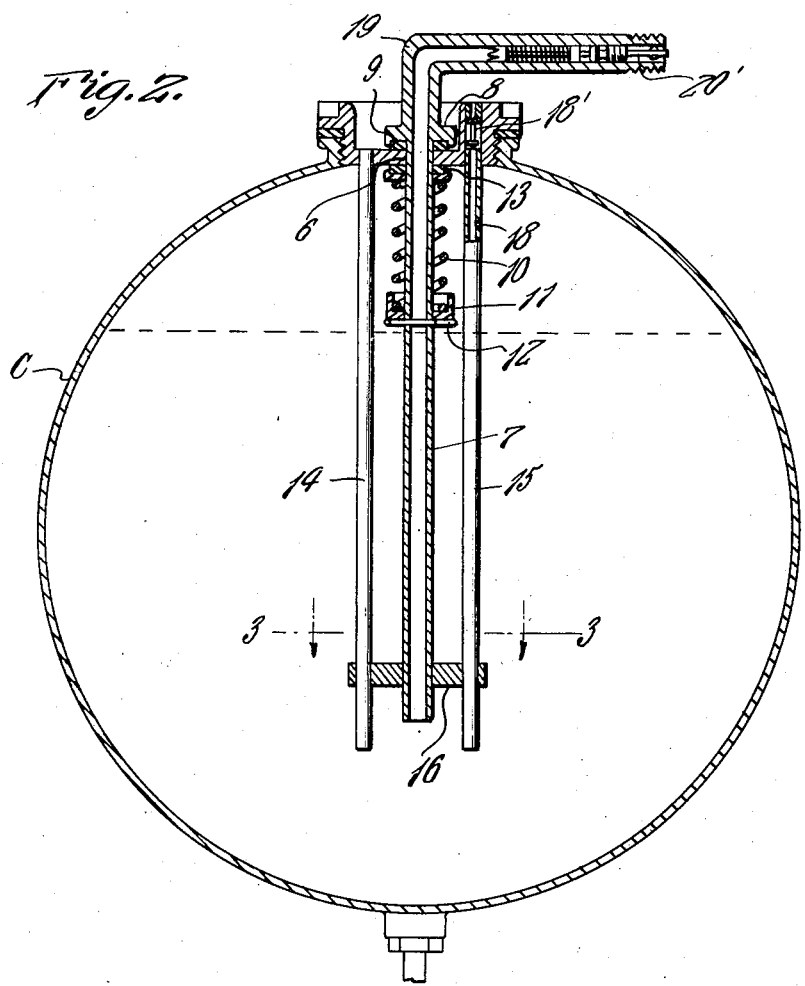
Figure 2 is a transverse sectional view taken through a fuel tank of the motor vehicle and showing the application of the tank portion of the device thereto.
Figure 3:
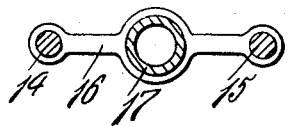
Figure 3 is a sectional view taken on line 3—3 of Figure 2.
Figure 7:
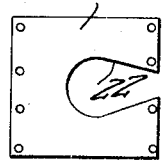
Figure 7 is a top plan view of the cap guard on a greatly reduced scale.
Figure 5:
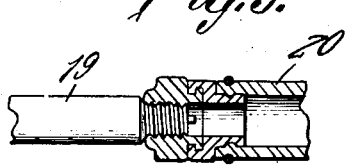
Figure 5 is a longitudinal sectional view taken through the nipple connection for the device.

Depending from diametrically opposite sides of the centrally disposed opening in a manner whereby the air inlet pipe 7 is arranged therebetween is a pair of rods 14 and 15 respectively. A spacer 16 is provided with suitably disposed openings for receiving the lower ends of the rods and pipe 7 respectively as clearly shown in Figure 2 of the drawings.

While the rods and spacer suitably brace the air inlet pipe 7 the rod 15 is provided for an additional purpose and is formed with a bore 17 and a vent opening 18 to provide communication between the inside of the tank C and the atmosphere. A valve 18' controls the communication, as when the tank is supplied with pressure the vent opening is not needed, as a vacuum in the tank will not exist under pressure as will be readily apparent.

The upper end 19 of the air inlet pipe 7 is bent at right angles and has its extreme end threaded to receive one end of a flexible conduit 20 while the opposite end of the conduit is suitably connected to the force pump 3 as shown in Figure 1. A valve 20' is arranged in the end 19 of the air inlet pipe 7 to prevent escape of air from the tank. The flexible conduit 20 is uncoupled from the end 19 when it is desired to remove the cap 5 for filling the tank or for other purposes.

A guard frame 21 is disposed about the tank C to prevent the seat cushion from coming in contact with the cap and a recess 22 is formed in the top wall of the frame to allow removal of the cap as will be obvious.

From the above description and drawings which form a part of this application it will be readily apparent that the device forming the subject matter thereof is adapted to supply compressed air to the fuel tank from the pressure pump 3 in a manner whereby the fuel in the tank will be put under pressure and forced to the carburetor of the motor vehicle under any existing condition.

In gravity feed fuel systems the device as above described is extremely useful and advantageous as if for any reason the fuel cannot be supplied to the carburetor of the motor vehicle it will be readily forced there by the tank pressure.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A pressure system for fuel tanks comprising a threaded cap for the tank, an air inlet pipe passing through the cap and said cap being mounted thereon for rotary movement, spring held air tight connecting means between the pipe and cap, a pair of rods depending from the cap, one of said rods being provided with a bore and a vent opening therefor, a spacing means for the lower end of said rods and pipe, and an air pump connected to said pipe as and for the purpose specified.

2. A pressure system for fuel tanks comprising a threaded cap, an air inlet pipe passing centrally through said cap and terminating adjacent the bottom of the tank, a shoulder formed on the pipe adjacent the cap, a flanged washer surrounding the pipe, gaskets engaging the upper and lower sides of said cap and being retained in said shoulder and washer respectively, a coil spring surrounding the pipe and putting the gaskets under compression, an elbow formed on the outer end of said pipe, a valve therefor, and an air conduit secured to said elbow as and for the purpose specified.

In testimony whereof I affix my signature.

RAY L. CROSS.